2,894,853

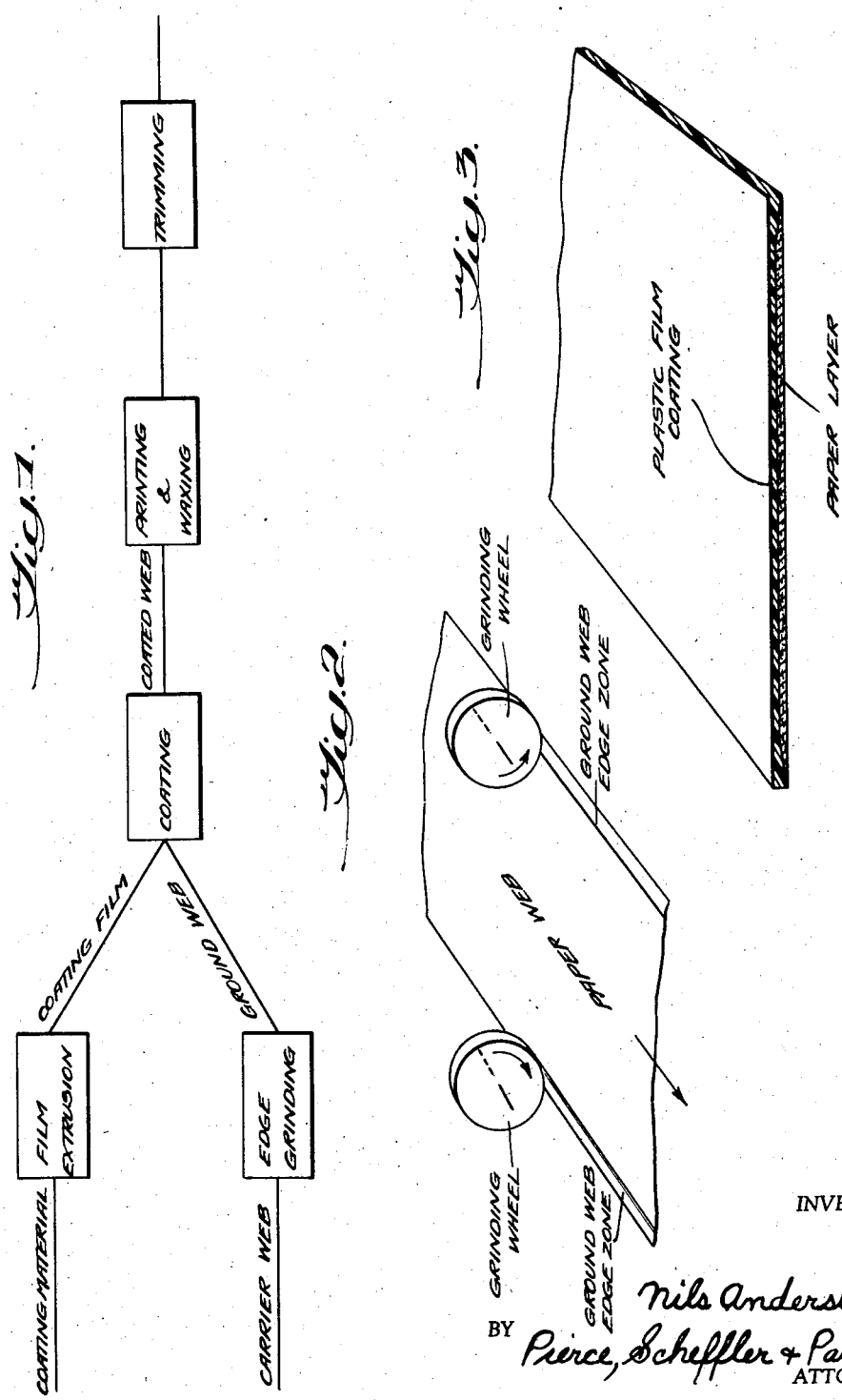

METHOD AND APPARATUS FOR EXTRUSION COATING AND PRODUCT

Nils Andersson, Lund, Sweden

Application July 5, 1957, Serial No. 669,923

Claims priority, application Sweden July 5, 1956

2 Claims. (Cl. 117—11)

The present invention relates to the coating of sheet materials and, more particularly, to a method of applying a film of a synthetic linear polymer of sharp melting point to a carrier web of at least the same width.

Methods have hitherto been described in which a film of a normally solid synthetic linear polymer of sharp melting point is extruded into contact with the sheet to be coated while in a molten condition, the molten film is pressed against said sheet and the surface of the molten film remote from the sheet is chilled to a temperature below the solidification point of the molten film, the contacting and pressing of said molten film against said sheet and its chilling being effected substantially simultaneously.

In carrying out such methods it is preferred to apply the film of polymer to the sheet by feeding the sheet into the nip of two adjacent parallel rolls rotating in opposite directions and extruding a molten film of the polymer parallel to the rolls and downwardly into the nip of the rolls, the molten film contacting the sheet at the nip of the rolls and not contacting either roll appreciably before the nip, and passing the film and sheet together through the nip of the rolls under pressure, the roll in contact with the film being maintained at a temperature below the solidification point of the molten film.

When extruding thin plastic films the longitudinal edges thereof owing to surface tension phenomena of the plastic in liquid state will become thicker than the adjacent portions of the film. Thus, the longitudinal film edges will have the appearance of continuous beads having curved cross-section the shape of which will depend on such factors as the inherent properties of the plastic material and the prevailing extrusion conditions.

When applying the full width of a thin extruded plastic film directly on to a running carrier web of the same width and of uniform thickness said edge beads of the film will form ridges along the corresponding longitudinal edges thereof. Such ridges not only complicate or make impossible the winding-up of the coated web but also cause substantial waste in cases where the coated web forms the starting material for further operations requiring a web material of substantially uniform thickness. Hitherto, to meet with said requirement the coated web edge zones corresponding to said ridges had to be cut away before the coated web was wound up and then was used e.g. for producing tetrahedron-shaped filled packages according to the Swedish Patent No. 131,599 dated March 27, 1944. Thus, both the carrier web and the extruded plastic film in the coating operation must have a width greater than that required in the final processing or production steps in order to provide for the excess width necessary for removal of the thickened edge-zones of the coated web. This, of course, will appreciably increase the costs of the production of the coated web.

A main object of the invention is to provide an economical process of applying full width extrusion films of synthetic linear polymers of sharp melting point to sheets of at least the same width and of substantially uniform thickness to yield coated sheets of substantially uniform thickness. A more specific object is to provide such a process for applying films of solid ethylene polymers, chlorinated solid ethylene polymers, and polyamides to sheets of paper, cloth or metal foil. Other objects will be apparent from the description of the invention given hereinafter.

These objects are accomplished according to the present invention by a process in which the carrier web before the coating operation is thinned on the side to be coated along two longitudinal zones each corresponding to an edge zone of the extruded film into such a cross-sectional shape in relation to the corresponding coating film edge zone cross-section that the corresponding longitudinal zones of the coated web will be of a thickness not exceeding that of other portions of the coated web.

While generally the above will sufficiently disclose the nature of the invention, there are given below a few aspects of the process in question as applied to the full width extrusion coating of a carrier web with a film of the same extrusion width.

It may be assumed that the coating layer consist of an extruded film of a normally solid synthetic linear polymer of sharp melting point, and that the carrier web is a continuous paper web of uniform thickness continuously fed from a supply roll during the coating operation. Furthermore, it may be assumed that the coated web is of substantially uniform thickness. The plastic film is applied to the paper web directly after the extrusion of the film whilst the latter has a temperature ensuring an adequate adhesion between the plastic material and the paper, the coating being completed by passing the film and the web together under pressure through the nip of two pressure rolls.

Before the coating operation, the side to be coated of the running paper web in accordance with the invention is subjected to a grinding treatment along its longitudinal edges to thin the web edges to such a cross-sectional shape in relation to the corresponding cross-sectional shape of the thickened film edge zones, dependent on the properties of the plastic material and the extrusion conditions, that the coated web produced will be of substantially uniform thickness along its transverse dimension.

The thickened edge zone profile of the plastic film is of curved or rounded shape owing to the surface tension of the plastic material in its liquid state, and therefore the thinned edge zone profile of the paper web should preferably have a concave shape complementary to the edge bead of the plastic film in order to accommodate same. Preferably, the ideal concave curvature of the paper web edge zones is approximated by a portion of an arc of a circle having a suitable diameter.

Such an approximation may be effected by grinding the paper web edges by means of grinding wheels fixed in relation to the travel of the paper web and being of an adequate diameter. Preferably, the grinding wheels rotate in planes transverse to the travelling direction of the paper web and about shafts adjustable in relation to the paper web plane and the respective paper web edges. The directions of rotation of the grinding wheels are preferably chosen in such a way that the grinding in the paper web edge zones will be effected in the direction from the inner web zone limit towards the web edge proper.

In certain cases uniform thickness along the transverse dimension of the coated web may be renounced to such an extent that thinner edge zones may be tolerated. The thinning of the paper web edges may then be carried out more or less as an ordinary chamfering, not resulting in a concave profile shape.

Through the process according to the invention there is gained not only a considerable decrease in waste in the production of coated webs of the kind in question but also an advantage hitherto not obtainable in connection with laminated or coated webs of uniform thickness. The thickened longitudinal edges of the extruded coating film which hitherto had to be removed after the coating process may be kept in accordance with the invention to form a considerable reinforcement of the coated web along those portions thereof normally subjected to the greatest stresses.

The process according to the invention is also applicable for the extrusion lamination of a full width extrusion film onto a carrier web which is of greater width than the film and projects beyond the same at least along one edge of the multiply web material. To accommodate the corresponding film edge bead displaced in relation to the carrier web edge the carrier web is provided with a longitudinal groove giving the carrier web a local concave cross-section profile adapted to the corresponding cross-section profile of the film edge bead in question and being similar to the previously mentioned edge zone shape of the carrier web.

The invention is illustrated by the accompanying drawings in which:

Fig. 1 is a flow diagram of the process,

Fig. 2 shows the grinding wheels operating on the paper web, and

Fig. 3 is a perspective view with the edges appearing in section of a composite sheet of paper and plastic film coating.

Referring to the drawings Fig. 1 is self-explanatory. In Fig. 2 the paper web and its direction of movement, the grinding wheels and their directions of rotation and the chamfered edges of the web produced by the grinding are indicated by suitable legends.

In Fig. 3 the paper web and the plastic film coating are designated by suitable legends. As appears at the right and left hand front corners of the sheet the edge portions of the paper web are wedge shaped becoming thinner toward the edge boundaries of the web while the film coating has a complementary shape being correspondingly thicker adjacent the side edge boundaries so that the edge portions of the paper web and the film coating give a combined thickness equal to the combined thickness of the web and film at other locations in the sheet where the web and film have their normal thicknesses.

The invention is illustrated but in no way limited by the following example.

*Example*

The example relates to the production of a packaging material to be used in the production of such tetrahedron-shaped liquid-filled packages as are disclosed in the Swedish Patent No. 131,599 and being marketed under the registered trademark "Tetra Pak."

Such packaging material consists of paper web of substantially uniform thickness, to one side of which there is applied a thinner polyethylene coating of substantially uniform thickness, the opposite web side being provided with a suitable printing as well as with a wax coating.

The continuous polyethylene coating of the paper web is carried out in accordance with e.g. the German Patent No. 831,311 the paper web being fed into the nip of two adjacent parallel rolls rotating in opposite directions and a molten polyethylene film being extruded parallel to the rolls and downwardly into the nip thereof to contact the web at the nip without contacting either roll appreciably before the nip. The film and web assembly is passed through the nip of the rolls under pressure, the roll in contact with the film being maintained at a temperature below the solidification point of the molten ethylene film.

The paper web width and the extrusion width of the polyethylene film are chosen substantially equal to each other, the corresponding longitudinal edges of the film and the web thus coinciding.

The full width coated web is continuously wound into a roll which is then transferred into a printing machine where the uncoated side of the web is printed in a suitable pattern. After the printing operation the composite web is coated with wax on its printed side and finally cut into a number of unit webs, if desired.

In the example considered, a paper web having a basis weight of 170 grammes per square meter corresponding to a thickness of about 0.22 mm. is carried into the nip of two adjacent parallel rolls rotating in opposite directions, one of the rolls being a polished steel roll about 450 mm. in diameter, the surface of which was kept chilled to a temperature of approximately 35° C. by internally circulating cooling fluid, the other roll being a rubber roll about 230 mm. in diameter. The rubber roll was at room temperature and adjustably supported to allow pressure variation.

An ethylene polymer having an average molecular weight of 20,000–30,000 was fed into an extruder having a slit-like die opening about 0.55 mm. wide. The temperature of the die was kept at about 280° C. during the extrusion. The extruded molten film was led through an air gap to the nip of the two rolls. The film came in contact with the paper web at the nip. The take-off speed of the united paper and film was varied up to about 60 meters per second to give an ethylene polymer film of a basis weight of about 45 grammes per square meter corresponding to a thickness of about 0.05 mm.

Owing to the extrusion and coating conditions mentioned as well as its inherent properties the molten ethylene polymer film had two longitudinal edge beads substantially of drop-shaped cross-section, each such bead being of a width of about 7 mm. and having a maximum thickness of about 0.20 mm.

To accommodate said film edge beads the paper web preparatory to the coating thereof was ground along its longitudinal edges on its side to be coated. Along each longitudinal paper web edge the grinding was effected by means of an individual fixed grinding wheel rotating in a plane transverse to the travelling direction of the paper web. The directions of rotation of the wheels were chosen so as to effect a grinding in each respective edge zone in the direction towards the web edge proper. The grinding wheels were of a diameter of about 180 mm., and, furthermore, each was arranged and set so as to grind an edge zone about 7 mm. in width, said ground edge zone decreasing in thickness towards the web edge proper where its thickness was about 0.07 mm.

Owing to the circular shape of the grinding wheels the carrier paper web assumed a somewhat cup-shaped cross-section along its edges, said cross-section approximating the corresponding rounded shape of the respective film edge beads.

In the coating operation the edge beads of the ethylene polymer film were accommodated in the corresponding bevelled edge zones of the paper web yielding a coated web of substantially uniform thickness of about 0.27 mm. across the total width thereof. Thus, the coated web needed no longitudinal edge trimming before the subsequent steps in the production of the packaging material in question.

If the step of thinning the edge zones of the paper preparatory to the coating thereof was not applied, the coated web had to be trimmed along its longitudinal edges removing a waste strip about 14 mm. in width along each longitudinal edge to yield a trimmed coated web of substantially uniform width that could be rewound into a roll and subsequently used in the printing and waxing steps. The trimming width of about 14 mm. when coating a uniformly thick unground paper web was found necessary as the extrusion film edge beads in passing through the roll nip tended to become flattened almost doubling their extruded width of about 7 mm.

With a view to the inevitable transverse deformation of the coated web in the printing and waxing steps, the coated web was subjected to an edge trimming of about 11 mm. along each longitudinal edge thereof after the printing and the waxing steps. Of course, such final edge trimming was also necessary in the justmentioned case of no preparatory edge grinding of the paper web. In that case, however only a 7 mm. final edge trimming was found necessary along both coated web edges to take care of the deformation. The difference of 4 mm. trimming width at each edge is explained by the fact the coated web edges in the case of preparatory edge zone grinding are more liable to deformation in the printing and waxing steps than the pre-trimmed edges in the case of no preparatory edge zone grinding.

Thus, the total waste of the process according to the invention amounted to a total trimming width of about 22 mm. which is to be compared with the total trimming width of about 42 mm. of the conventional process of producing a packaging material without preparatory grinding the edge zones of the paper web to be coated.

The starting width of the paper web and the extrusion width of the ethylene polymer film were 1170 mm. Thus the waste percentage amounted to 1.88% of the starting width. The corresponding waste percentage when applying the conventional process will amount to 3.59% of the starting width. The net gain of the present process as to the waste percentage is about 1.71%, meaning that the process according to the invention reduced the waste by about 47.62% as compared to the conventional process mentioned.

When applying the present process to the production of packaging material of the kind in question, the starting width of the paper web and the extrusion width of the ethylene polymer film may be reduced by 20 mm. in comparison to those of the conventional process in which no edge zone grinding of the paper web is effected, if the same final coated web width is to be yielded in the cases.

What is claimed is:

1. In a method of applying full width extrusion films of synthetic linear polymers of sharp melting point to sheets of at least equal width and of substantially uniform thickness wherein a molten film the longitudinal edge zones of which are bead-shaped and thicker than the other portions of the film owing to the surface tension of the molten film and its extrusion conditions is extruded to contact with the sheet to be coated whilst still in molten condition, the molten film is pressed against said sheet and the surface of the molten film remote from the sheet is chilled to a temperature below the solidification point of the molten film, the contacting and pressing of said molten film against said sheet and its chilling being effected substantially simultaneously, the improvement which consists in that said sheet on its side to be coated is thinned along two longitudinal zones each corresponding to an individual bead-shaped edge zone of the extruded film into such a cross-sectional shape in relation to the corresponding film edge zone cross-section profile that the corresponding longitudinal zones of the coated sheet will be of a thickness not exceeding that of other coated portions of the sheet.

2. A method according to claim 1, wherein said sheet on its side to be coated is thinned along two longitudinal zones each corresponding to an individual bead-shaped edge zone of the extruded film into such a concave conjugate profile in relation to the corresponding coating film edge zone cross-section profile that the coated web will be of a substantially uniform thickness across its total coated width.

References Cited in the file of this patent

UNITED STATES PATENTS

| | | |
|---|---|---|
| 1,472,230 | Plum | Oct. 30, 1923 |
| 1,932,057 | Wheeler | Oct. 24, 1933 |
| 2,712,508 | Massey | July 5, 1955 |
| 2,770,080 | Hoyt | Nov. 13, 1956 |